United States Patent [19]
Okamoto et al.

[11] Patent Number: 4,986,384
[45] Date of Patent: Jan. 22, 1991

[54] REMOTE CONTROL SYSTEM OF MOBILE OBJECTS

[75] Inventors: Hironobu Okamoto; Tetsujirou Izumi; Hiroo Kishi; Naoki Okamoto, all of Ichikawa, Japan

[73] Assignee: Robotech Laboratory Co., Ltd., Chiba, Japan

[21] Appl. No.: 420,267

[22] Filed: Oct. 12, 1989

[30] Foreign Application Priority Data

Oct. 19, 1988 [JP] Japan .................. 63-263431

[51] Int. Cl.$^5$ .............................. G05D 1/02
[52] U.S. Cl. ................... 180/167; 340/435; 364/424.02
[58] Field of Search ........ 180/167, 168, 169; 340/435, 436, 901, 941; 364/424.02, 436, 461

[56] References Cited

U.S. PATENT DOCUMENTS

| | | | |
|---|---|---|---|
| 4,727,492 | 2/1988 | Reeve et al. | 364/424.02 |
| 4,817,000 | 3/1989 | Eberhardt | 180/169 |
| 4,864,298 | 9/1989 | Dombrowski | 180/169 |
| 4,882,694 | 11/1989 | Brubaker et al. | 180/168 |

Primary Examiner—David M. Mitchell
Attorney, Agent, or Firm—McAulay, Fisher, Nissen & Goldberg

[57] ABSTRACT

A remote control system for a mobile object, comprising radio beacons each consisting of a master station and some substations, a mobile communication station mounted on each auto-pilot mobile for receiving the radio wave, such as millimetric, from each radio beacon, to let the mobile recognize its own position on the route map, and a control station for transmitting and receiving signals by radio waves to and from the mobile station so as to instruct and correct the moving route of the mobile. Each mobile station is equipped for detecting any corrugations on the route immediately ahead of it, for detecting the ground speed of the mobile, and preferably, for detecting the direction of the mobile so that each mobile station can manage the speed of the mobile object as its master, and can correct and change the route of the mobile on the map by the discriminated signals from these detectors, and the instructions from the control station on the basis of discrimination signals.

3 Claims, 7 Drawing Sheets

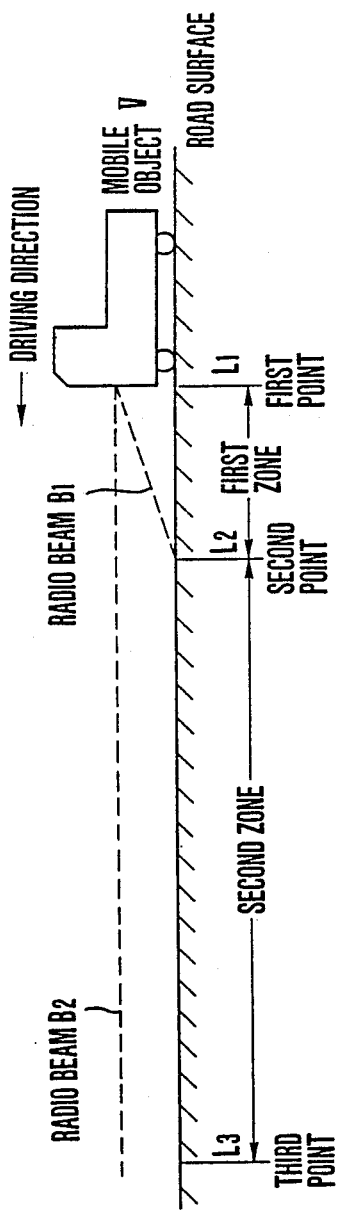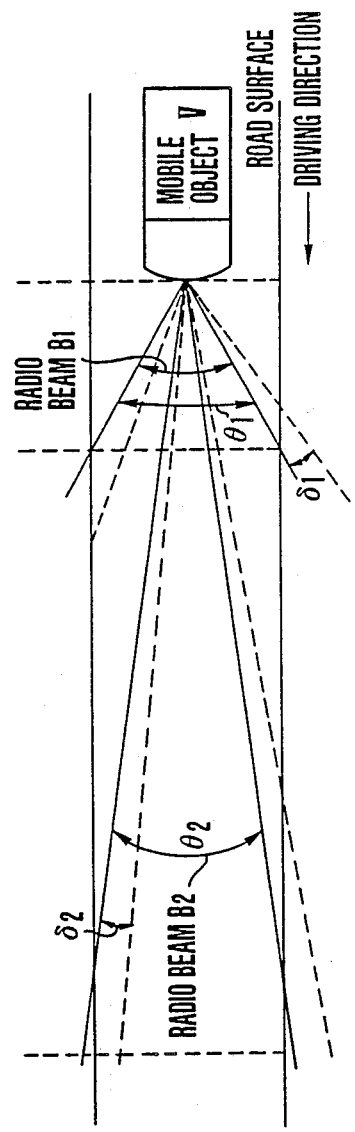
FIG.3(A)
FIG.3(B)

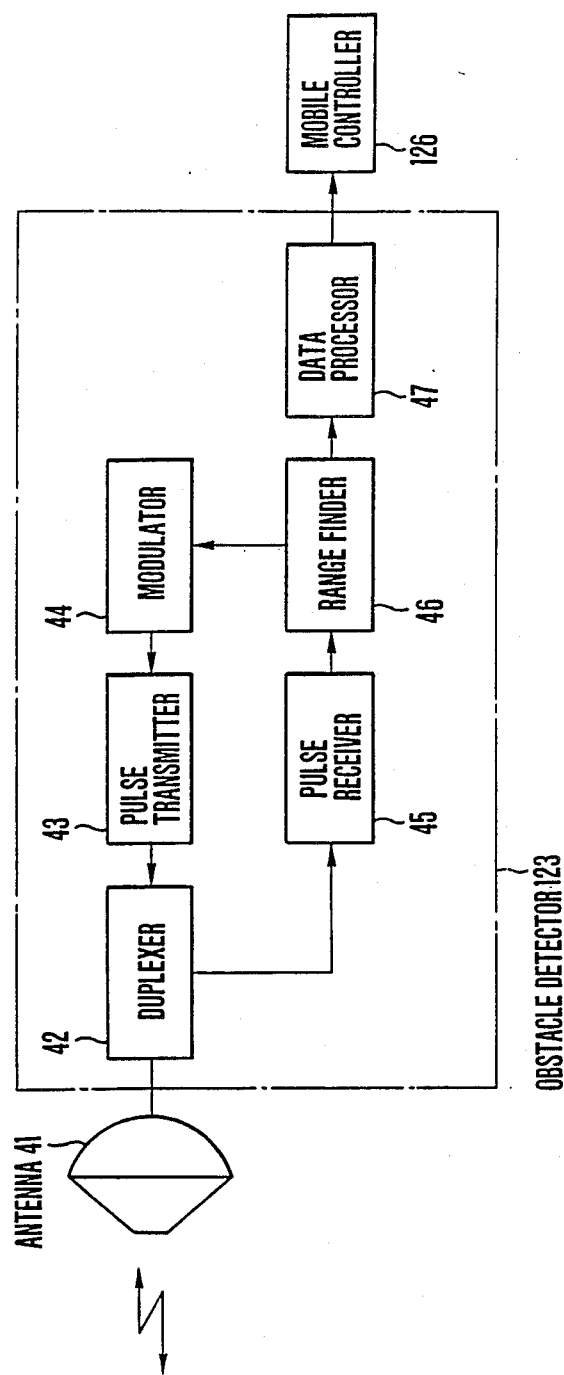

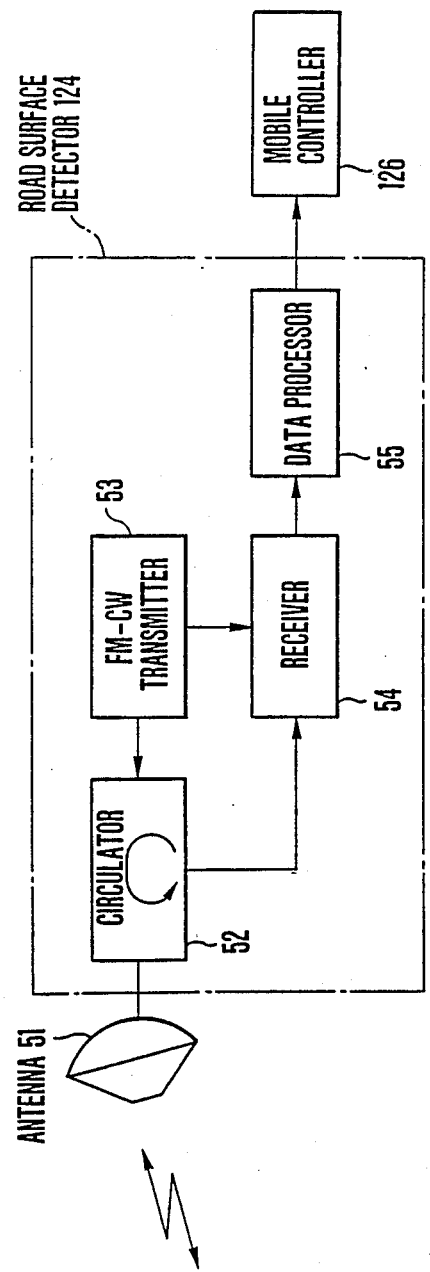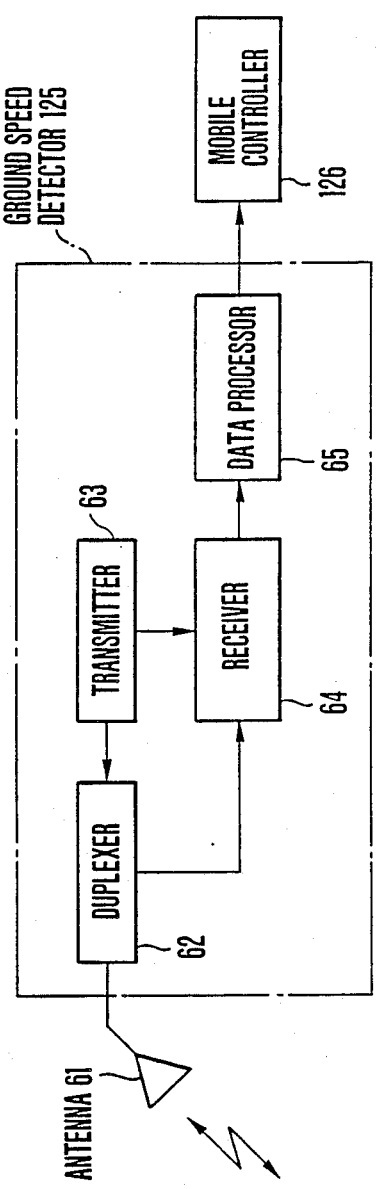

REMOTE CONTROL SYSTEM OF MOBILE OBJECTS

BACKGROUND OF THE INVENTION

This invention relates to a remote control system of mobile objects (hereinafter referred to generally as the "mobile") which enables a plurality of auto-pilot (unmanned) mobiles to detect any obstacles and rough road on their forward route while recognizing their own positions on the route map and to move while avoiding these obstacles and rough road.

Unmanned operation of mobiles such as bulldozers, crane cars, dump cars, and the like, has been attempted in order to eliminate or reduce man power. For providing unmanned and automatic operation of these mobiles, a technique which enables the mobiles to recognize their own positions on the route map is of the utmost importance. For use as a method which makes it possible for the mobiles to recognize their positions, a system is known in which optical or electromagnetic guide lines are arranged in the route and a range-range system in which radio waves are transmitted and received between two fixed stations and the mobiles to recognize the positions of the mobiles.

However, these conventional systems are not free from the following drawbacks:

1. The route of the mobile is limited by the set position of the guide line.
2. A large number of communication channels are necessary to detect the positions of a large number of mobiles and it is difficult to differentiate received waves from many transmitting channels and to prevent radio cross-talk between a large number of mobiles.
3. A technique for automatically detecting and avoiding any obstacles and any irregularities existing on the scheduled route of the mobile has not yet been established.

In view of the problems described above, the development of a remote control system capable of moving, accurately and reliably, various types of mobiles such as a bulldozer, a crane car, a tractor, or the like, to a desired position and making them perform a predetermined operation through an unmanned control at the work site has long been desired in the fields of civil engineering, mining industry, agriculture, and the like.

SUMMARY OF THE INVENTION

To satisfy the above requirements, the present invention is directed to providing a remote control system for accomplishing safe and optimum operation of a mobile by enabling one or more mobiles, which move automatically at a relatively low speed inside an area having a radius of several kilometers, for example, to recognize their own positions on a route map by using electromagnetic waves in the millimetric band, (wavelength in the millimeter range) hereinafter referred to as the "radio wave", to detect any forward obstacles and the like by a sensor or a detector provided in the mobile and to avoid the obstacles through a discriminating ability based on the detected signal.

The remote control system of mobiles in accordance with the present invention comprises radio beacons each consisting of a master station and some sub-stations corresponding to the former. Also, included are communication stations (hereinafter referred to as the "mobile stations") mounted on each autopilot mobile for receiving the radio wave such as the millimetric wave from each radio beacon, and to let the mobile recognize its own position on the route map. The remote control system also comprises a control station for delivering and receiving signals by the radio waves with the mobile station to instruct and correct the moving route of the mobile station. In this case, each mobile station is equipped with a functional part for detecting any forward obstacles on its route, for detecting any corrugations on the route immediately ahead of it, for detecting the ground speed, and preferably a functional part for the direction of the mobile, so that each mobile station can manage the speed of the mobile as its master and can correct and change the route of the mobile by the discriminated signals from these functional parts and the instruction from the control station on the basis on these discriminated signals. In this manner, the objects of the invention described above can be accomplished.

For a better understanding of the present invention, reference is made to the following description and accompanying drawings while the scope of the invention will be pointed out in the appended claims.

BRIEF DESCRIPTION OF THE DRAWINGS

The accompanying drawings illustrate a preferred embodiment of the present invention, wherein;

FIGS. 3(A) and 3(B) are useful for explaining the detection of the forward view of the route of a mobile object;

FIG. 4 is a block diagram of an obstacle detector;

FIG. 5 is a block diagram of a road surface detector;

FIG. 6 is a block diagram of a ground speed detector;

DESCRIPTION OF THE PREFERRED EMBODIMENTS

Hereinafter, a preferred embodiment of the present invention will be described in detail with reference to the accompanying drawings.

Figure 1:
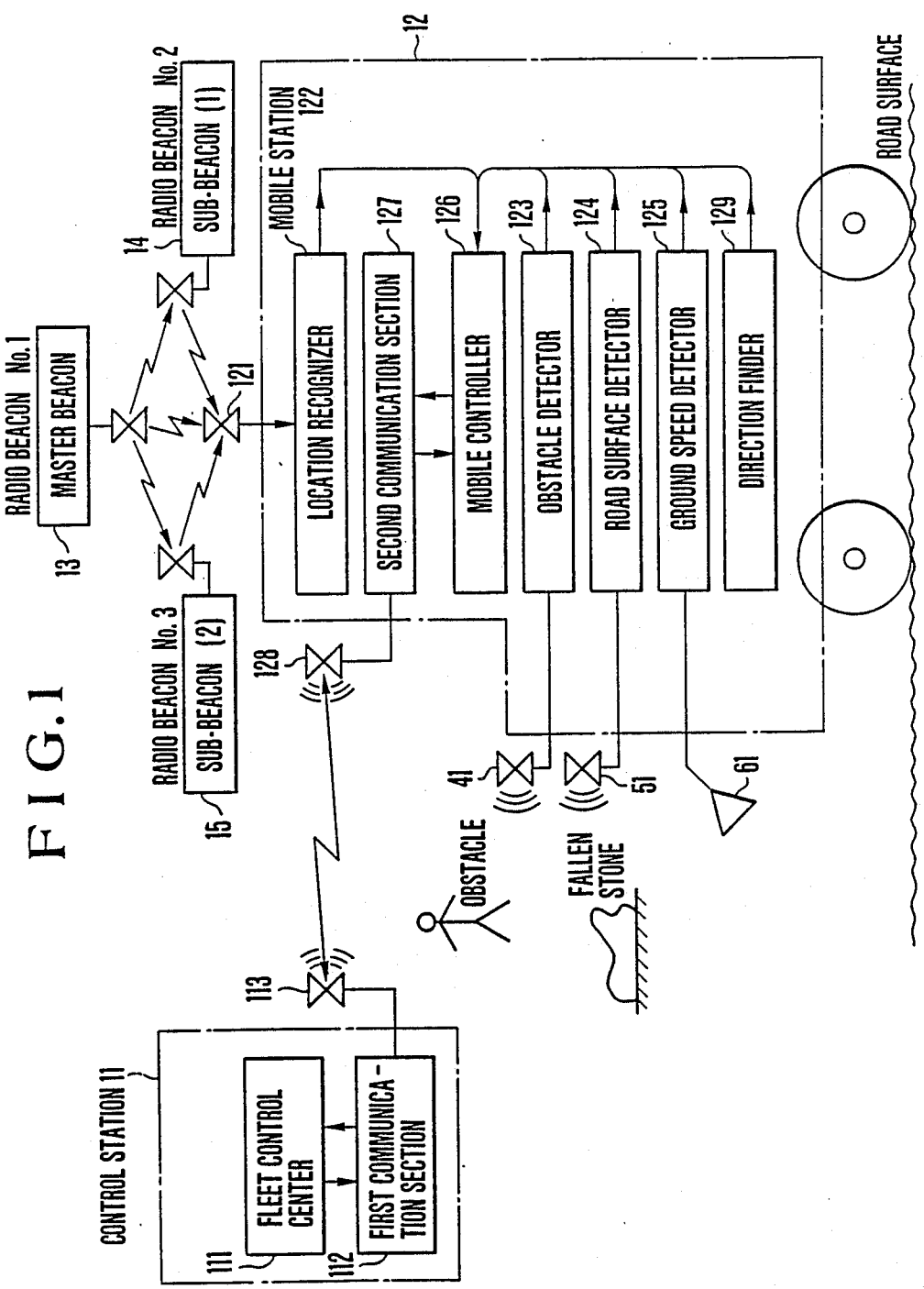
FIG. 1 is a basic structural view of the present invention.

In FIG. 1, reference numeral 11 represents a control station and 12 represents a mobile station. Reference numerals 13, 14 and 15 represent radio beacons and among them, 13 is a master beacon and 14 and 15 are sub-beacons.

Radio waves of a millimetric wavelength, a carrier, are transmitted and received between the master beacon 13 and each sub-beacon 14, 15 and the mobile station 12, too, receives the radio wave of each of these radio beacons.

The control station 11 transmits and receives another millimetric radio wave (another carrier) to and from the mobile station 12 and remotely supervises the operation condition of the mobile station (a mobile object) by its signal.

The mobile recognizes its own geographical position (the position on the route map) with its own mobile station 12 from the received signals from the radio beacons 13, 14, 15 by the operation of a location recognizer 122 in accordance with a known radio navigation method. In this case, if hyperbolic navigation is employed, the mobile station 12 can be constituted as a reception-only station so that even when a plurality of mobile stations (mobile objects) commonly share the signal wave, each can recognize its position independently.

To survey the road condition on the route in front of the mobile V (V is the notation of a mobile), an obstacle detector 123 and a road surface detector 124 are provided in the mobile station 12.

The road surface detector 124 detects the existence of any corrugations of the road and small obstacles in a zone (the zone immediately ahead of the mobile V: hereinafter referred to as a "first zone") from the foremost end of the mobile V (first point $L_1$ in FIG. 3) to a point somewhat ahead of it (second point $L_2$ in FIG. 3) and the obstacle detector 123 detects the existence of any obstacles in a zone remote from the second point $L_2$ (hereinafter referred to as the "second zone").

In the obstacle detector 123, the radio wave of a pulse transmitter 43 driven by a modulator 44 is spotted as a radio beam from an antenna 41 through a duplexer 42, as shown in FIG. 4, and spotted as a radio beam $B_2$ of FIG. 3 to the second zone ahead of the mobile V. The beam $B_2$ is scanned within the range of the deflection angle $\delta_2$ on both sides of the heading of the mobile V with its electric axis being kept inside a plane which is parallel to the road surface of the second zone.

The reflected wave from inside the second zone is demodulated by a pulse receiver 45 through the antenna 41 and the duplexer 42, then is converted to a measured value by a range finder 46 and thereafter is converted to control data by a data processor 47, which outputs an information signal of the distance to the obstacle and an information signal of the direction in which the obstacle exists.

The second point $L_2$, which is the closer point of the second zone, is set by the functions of the pulse transmitter 43, pulse receiver 45, range finder 46 and data processor 47 and is most preferably set to be in coincidence with the foremost position of the mobile V (the first point $L_2$ in FIG. 3). The third point $L_3$, as the more remote point of the second zone, is set whenever necessary.

The beam width $\theta_2$ of the beam $B_2$ the width of the road of the second zone (which is generally the width necessary for supervision). A millimetric radio wave, for example, is used as the carrier of the beam $B_2$.

In FIG. 5, which shows the road surface detector 124, an FM-CW transmitter 53 generates an FM wave which changes the frequency of the CW wave, of a millimetric band as the carrier, while periodically sweeping the frequency. The main reflector of an antenna 51 is composed of a spheroidal surface and it is fitted with its major axis facing the road surface immediately ahead of the route of the mobile. The radius of curvature of the ellipsoid of the main reflector is set so that output radiation and input reception are focussed on the first focal point, and the second focal point is adjusted to the spot point on the road surface.

The signal generated by the FM-CW transmitter 53 passes through a circulator 52, is spotted as the beam $B_I$ from the antenna 51, and spots one point in the first zone which is the zone from the first point $L_1$ as the foremost end of the mobile V to the second point $L_2$ (this spotted point is not strictly a point, but has a somewhat small expansion range in practice). The reflected wave from this spotted point is demodulated by the receiver 54 through the antenna 51 and the circulator 52 and is then delivered to the data processor 55. The wave is mixed with the transmission signal in the receiver 54 and their output signal is provided to the input of the data processor 55. The beat frequency provided hereby contains information representing the distance to the spotted point of the beam $B_1$ on the road surface.

The range information of this system is highly sensitive to a minute variation of distance to such an extent that in the case of the FM-CW wave of the millimetric band, the existence of any corrugations and small obstacles can be detected. Since the reflected waves from these surface irregularities or small obstacles have greater energy then the reflected wave from a flat or smooth surface, this system can detect any bad condition and small obstacles on the road surface immediately ahead of the mobile V.

The antenna 51 scans horizontally (in a direction-orthogonal to the moving direction of the mobile V). The same consideration is given for the beam width $\theta_1$ and deflection angle $\delta_1$ of the beam $B_1$ as for the beam width $\theta_2$ and deflection angle $\delta_2$ of the second zone, so that the beam-spotted point covers the width of the road surface inside the first zone.

When the present system is used, the first zone and the second zone are set so that overlap portions appear ahead and behind the second point $L_2$. But, it is preferable to bring the second point $L_2$, which is the closer point of the second zone, as close as possible to the first point $L_1$ and, if possible, to bring them into coincidence with each other (whereby the first zone is absorbed in the second zone and the function of the obstacle detector 123 includes also the function of the road surface detector 124). If the second point $L_2$ can thus be brought into coincidence with the first point $L_1$, it is not necessary to set positively the first zone or, in other words, to include the road surface detector 124. It is preferable, however, to set a first zone or to use the road surface detector 124 not only when the second point $L_2$ cannot be brought into coincidence with the first point $L_1$ but also when it can.

When a radio wave is used for the beam $B_1$ of this road surface detector 124, a millimetric wave, for example, is applicable.

In the ground speed detector 125 shown in FIG. 6, the signal wave is emitted from a transmission-reception antenna 61, which is directed somewhat downward in front of the mobile V through a duplexer 62 to the road surface. The reflected wave from the road surface is received by the transmission-reception antenna 61, passes through the duplexer 62, is translated into a measurement value by a receiver 64 and a data processor 65, and is outputted as the ground speed signal. In this case, a radio wave, a supersonic wave or a sonic wave is used suitably as the signal wave and the ground speed information is obtained by, for example, utilizing the Doppler effect due to the driving speed of the mobile V, for example. A millimetric wave, for example, is used when a radio wave is used.

While the foregoing description and drawings represent the preferred embodiments of the present invention, it will be obvious to those skilled in the art that various changes and modifications may be made therein without departing from the true spirit and scope of the present invention.

The direction finder 129 consists, for example, of a compass, a gyrocompass or a gyroscope mounted on the mobile V so as to output a direction signal, to analyze the track of the mobile V from the position information as the output of the location recognizer 122, to calculate the present driving direction of the mobile V and to suitably calibrate the accumulated errors of the output of the gyroscope or the like by this data.

When only a radio navigation method is used, it is possible to incorporate the direction finder 129 into the location recognizer 122 so that the track of the mobile V is analyzed and calculated from the position information of the location recognizer 122 and information of the driving direction of the mobile V is outputted.

Figure 7:
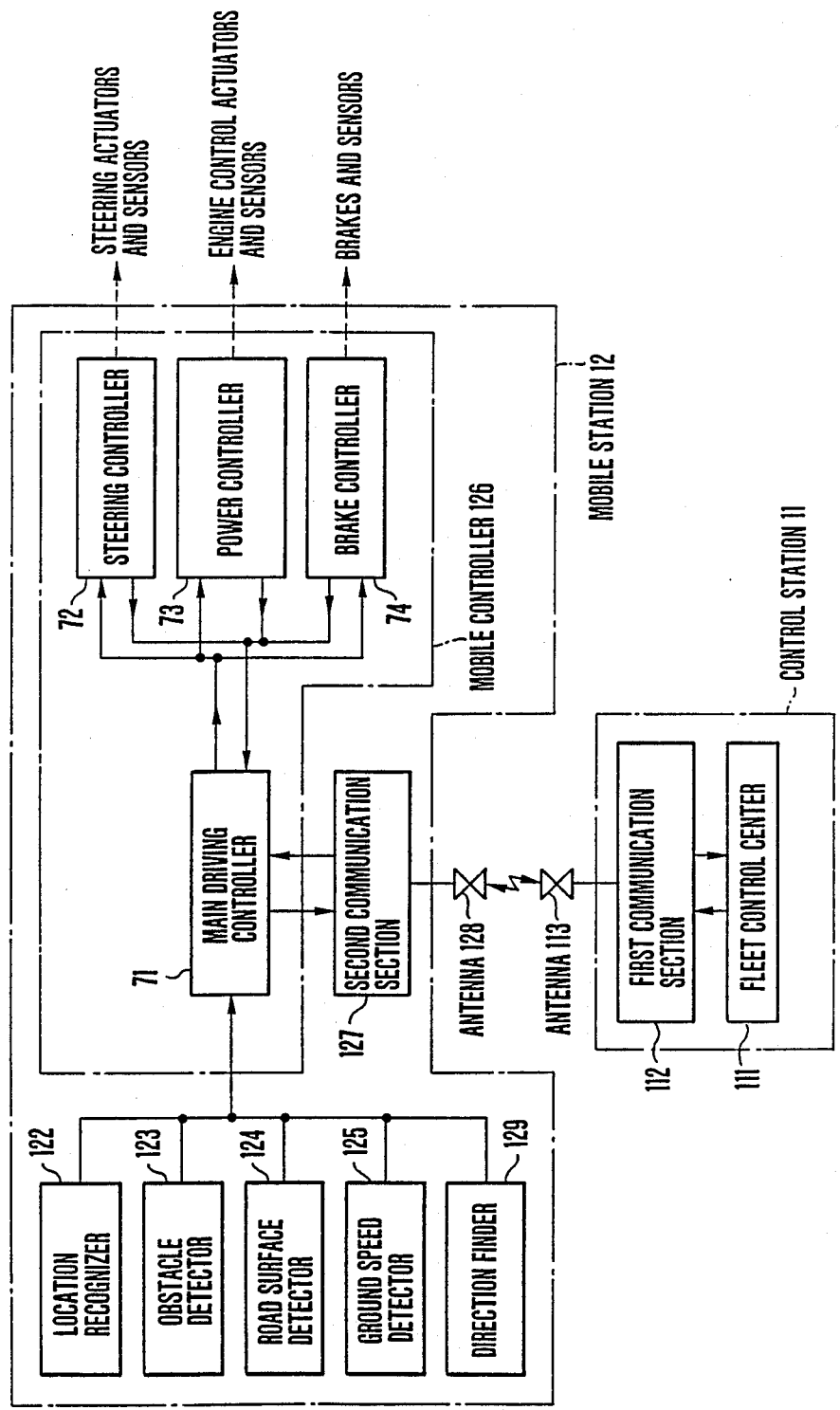
FIG. 7 is a block diagram of a mobile controller.

FIG. 7 shows a mobile controller 126, which includes a main driving controller 71, a steering controller 72, a power controller 73 and a brake controller 74.

The main driving controller 71 receives map data (route map), representing a scheduled driving route, from a fleet control center 111 in the control station 11 through a second communication section 127 in the mobile station 12 and through a first communication section 112 in the control station, and generates an instruction to the steering controller 72 so as to correct deviations from the scheduled driving route on the basis of the information of the map data and the position information from the location recognizer 122. Then the steering controller 72 controls steering actuators in order to let the mobile V follow the scheduled driving route.

The main driving controller 71 receives the obstacle information from the obstacle detector 123 and the road information from the road surface detector 124, instructs the speed control to the power controller 73 and to the brake controller 74 to avoid collision, and also commands the steering controller 72 to effect avoidance performance, for example, by detouring in cooperation with the fleet control center 111.

The fleet control center 111 inside the control station 11 is managed and operated by an operator.

This fleet control center 111 provides the scheduled driving route map data for each mobile ($V_1, V_2, \ldots V_n$) through the first communication section 112 of the control station 11 and through the second communication section 127 of the mobile station 12, and each mobile runs on the basis of this map data. The fleet control center 111 receives information from each mobile of its position through the first communication section 112 and the second communication section 127 and monitors the actual position of each mobile. When each mobile avoids any obstacles or rough road, the fleet control center 111 closes or changes the scheduled one or another redundant route in order to prevent head-on or rear-end collision between the objects, instructs such preventive action for each mobile whenever necessary, and manages and controls each mobile.

Needless to say, route change/correction instructions of a mobile may be inserted as part of the signal generated by the fleet control center 111, whenever necessary, on the basis of the operator's voluntary intentions, irrespective of the obstacle and road surface conditions ahead.

The control station 11 is provided with the first communication section 112 and the mobile station 12 is provided with the second communication sections 127. A millimetric wave, for example, is used between these first and second communication sections 112 and 127 to form a two-way communication network and to constitute a communication channel comprising the combination of the control station 11 with the mobile station 12. This also holds true of each communication channel comprising combination of the first communication section 112 of the control station 11 and the second communication section $127_1, 127_2, \ldots 127_n$ of each of the mobile stations 12 when several mobiles ($V_1, V_2, \ldots, V_n$) are in use.

Figure 8:
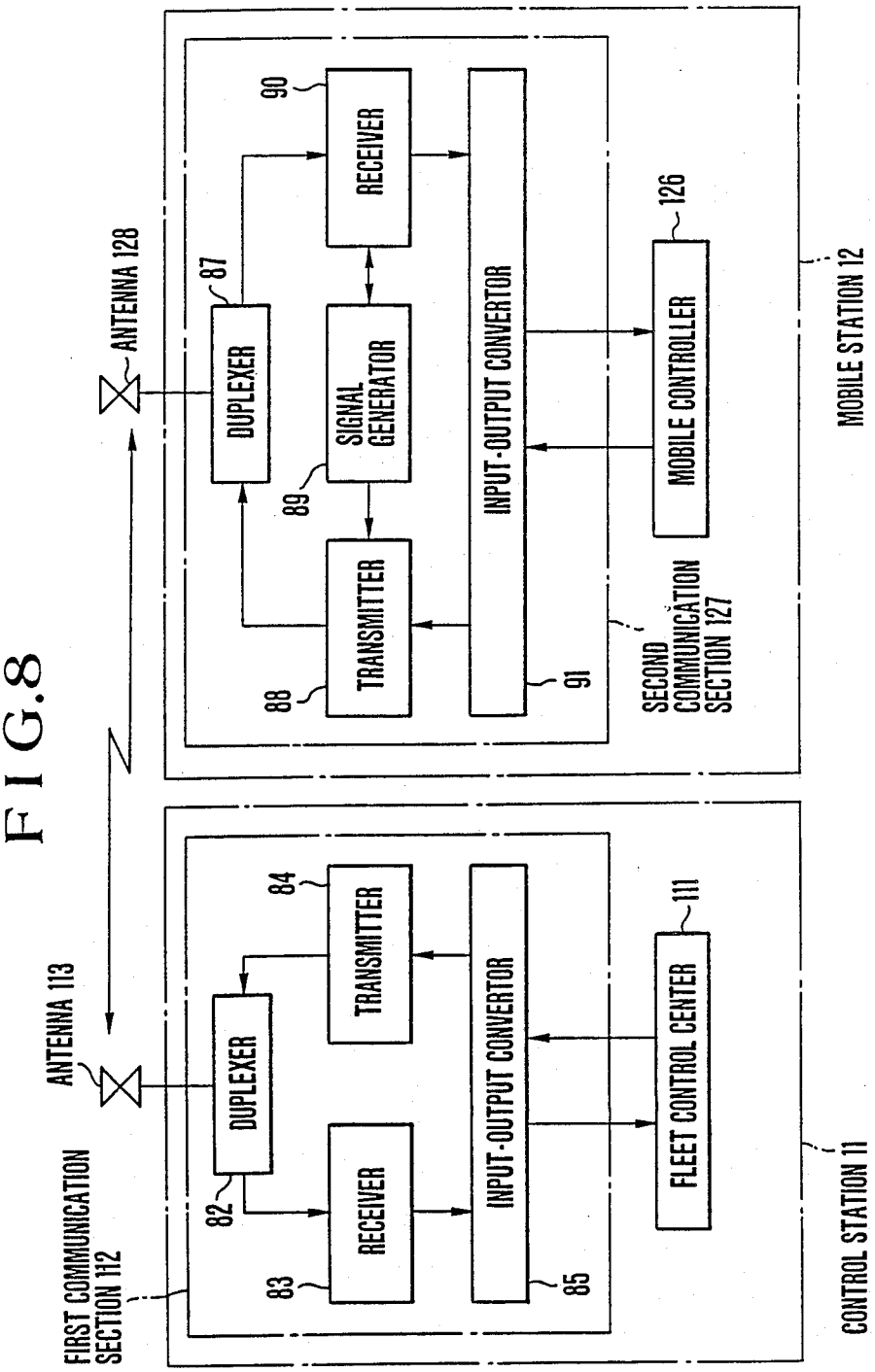
FIG. 8 is a block diagram of a communication arrangement consisting of first and second communication sections.

FIG. 8 shows a communication channel consisting of the first communication section 112 of the control station 11 and the second communication section 127 of one mobile station 12.

In the mobile station 12, information of position, obstacles, road surface condition, ground speed, heading direction and other information of the mobile V, such as its maintenance information that are integrated and arranged by a mobile controller 126, are digitized into a signal suitable for modulation at the time of transmission by an input-output convertor 91 of the second communication section 127, and are then modulated by the transmitter 88 and sent to the control station 11 by the millimetric carrier from the antenna 128 through the duplexer 87. The signal from the antenna 113 through the duplexer 82, is demodulated in the control station 11 by the receiver 83, and is then digitized into a signal suitable for various management processings by the input-output convertor 85 and sent to the fleet control center 111.

The various command signals and various data acceleration/deceleration commands, stop/start commands, route change commands, map data of scheduled driving route, etc.) necessary for the management of the mobile V are delivered from the fleet control center 111 in the control station 11, and then enter the input-output convertor 85 of the first communication section 112, where they are converted to a signal suitable for transmission. The signal is then modulated by the transmitter 84 and is sent to the mobile station 12 by the millimetric carrier from the antenna 113 through the duplexer 82. The signal thus received enters the duplexer 87 of the second communication section 127 from the antenna 128 in the mobile station 12, and enters the receiver 90 through the duplexer 87, where it is demodulated, and is thereafter digitized into signals suitable for various controls by the input-output convertor 91. These signals are inputted to the main driving controller 71 of the mobile controller 126.

In the second communication section 127 of the mobile station 12, a signal generator 89 synchronizes time relationships of all corresponding parts in the system and makes timed control of the transmission and reception between the station 12 of its own and the control station 11 by using an identified time slot allotted thereto to avoid radio cross-talk occurrences with other mobile stations when the station of its own makes communication with the control station 11.

The antenna 113 of the control station 11 is of a fan beam type, for example, so that it has extremely broad directivity within a horizontal plane, while the antenna 128 of the mobile station 12 is omni-directional or approximate thereto, so that even when the mobile V moves or turns within the scheduled area, no trouble occurs in the mutual communication between the control station 11 and the mobile station 12.

When any communication trouble occurs due to deterioration of the radio wave condition and/or for some other reasons, it is preferred for the purpose of control that the main driving controller 71 switches the mobile controller 126 to an emergency stop mode as the emergency measures. This is accomplished, for example, by letting the mobile V move automatically for a short time on the basis of the map data provided in advance from the control station 11 and on the basis of the data from the direction finder 129 and/or by letting the mobile V move to a safe spot nearest thereto and letting it stand there.

Figure 2:
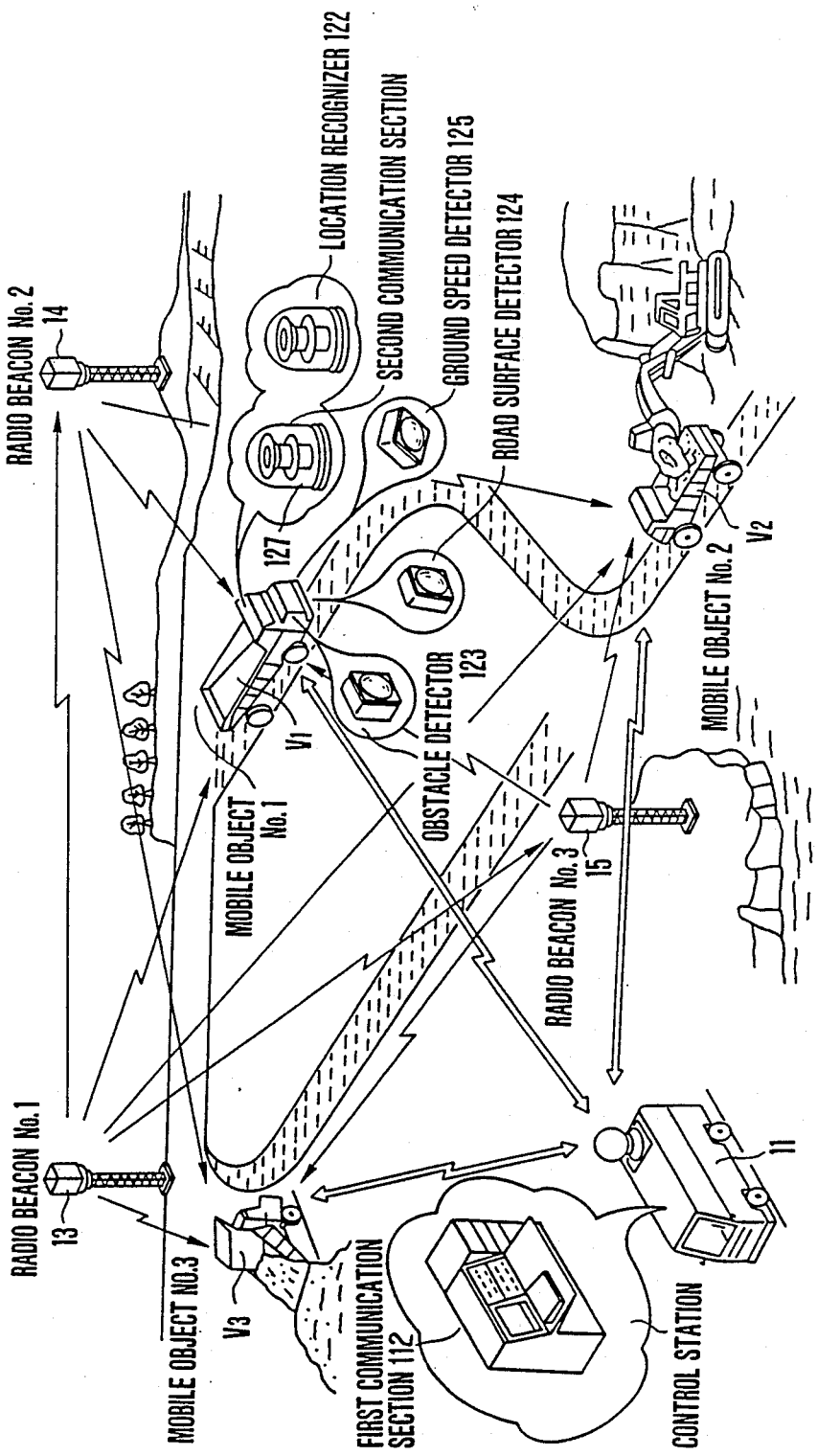
FIG. 2 is a bird's-eye view of the field of the present invention.

FIG. 2 is a bird's-eye view showing the overall system structure according to the present invention. The drawing can be understood in view of the description given above. In the drawing, a total of three radio beacons and three trucks, as representing the mobile objects, are shown and the control station is mounted on a vehicle and is positioned inside the work area together with the trucks.

As described above, in accordance with the present invention, the mobile can definitely and accurately detect at its actual position any obstacles and the road surface condition in a close range in its forward scheduled driving route. Even when several such mobiles are in use, the control station can control them individually and can control accurately the route change or correction of each mobile.

Since each mobile recognizes its actual position by utilizing radio navigation methods and sends this position information to the control station, the control station can recognize the actual position of each mobile even when management commands such as a route change, need not be made.

It is not necessary to use any special equipment for controlling the scheduled route of the mobile. Accordingly, the driving position and driving range of the mobile are not essentially restricted.

While the scheduled route is determined by the map data, the route can be changed, whenever necessary, so that the mobile's flexibility in operation is high.

If a millimetric wave is used as the transmission medium and the signal wave for the purpose of mutual information exchange between the radio beacons, the mobile stations and the control station and for the purposes of accomplishing each function, such as forward condition detection, and for controlling each of the mobiles and for allowing each mobile to discriminate the condition inside a zone having a radius of several kilometers, for example, a high density of signals can be accomplished due to straight line propagation and its very high frequency. Control efficiency is therefore excellent when a plurality of mobiles exist inside a provided zone.

As described above, the present invention provides a system capable of managing individually a plurality of mobiles in accordance with the condition of each of them by means of a concentrated management system while detecting accurately the forward route condition close to each mobile. Since the present system can let a plurality of mobiles move automatically and individually, it provides a great practical advantage.

The present invention will be extremely effective when applied to the mobiles of the unmanned automatic operation system, but it can of course be applied to manned mobiles, whenever necessary.

Although, the present invention has thus been described definitely with reference to one preferred embodiment thereof, it is not particularly limited thereto but can of course be changed or modified in various ways without departing from the spirit and scope thereof.

What is claimed is:

1. A remote control system for mobile objects, comprising:
    a plurality of radio beacons;
    a control station; and
    one or more mobile stations;
    each of said mobile stations being mounted on a mobile object;
    each said mobile station comprising;
    a location recognizer for recognizing its own position on a route map set in advance by a signal from said radio beacons,
    an obstacle detector for detecting the existence of any obstacles on the forward route of said mobile object,
    a ground speed detector for detecting the ground speed of said mobile object,
    a mobile controller for receiving the output signal of said location recognizer, the output signal of said obstacle detector and the output signal of said ground speed detector, and
    a communication section for communicating with said control station;
    said control station comprising;
    another communication section for communicating with each of said mobile stations, and
    a fleet control center for generating a change command for a route on the basis of said route map and the information received from said mobile controller;
    said mobile controller controlling the movement of its own mobile object on the basis of one or more of said received output signals and the command from said fleet control center; and
    said fleet control center supervising the operation of said one or more mobile objects on the basis of one or more of said output signals.

2. A remote control system of mobile objects, according to claim 1, wherein each of said mobile stations is equipped with a road surface detector for detecting the condition of the road surface immediately ahead of said mobile object, an output signal of said road surface detector being applied together with an output signal of said obstacle detector to said mobile controller, and said fleet control center operating to supervise the operation of said mobile object based on the signal from said road surface detector.

3. A remote control system of mobile objects according to claim 1, wherein each of said mobile objects is equipped with a direction finder capable of calibration, and the operation of each of said mobile objects being supervised while the moving direction of said mobile object is being detected by said direction finder.

* * * * *